W. J. RICKETS.
HIGH AND LOW PRESSURE CONTINUOUS CURRENT SYSTEM.
APPLICATION FILED APR. 6, 1914.

1,176,316.

Patented Mar. 21, 1916.
2 SHEETS—SHEET 1.

Witnesses:
E. R. Peck
Allen C. Peck

Inventor:
W. J. Rickets
by
Hulbert E. Peck

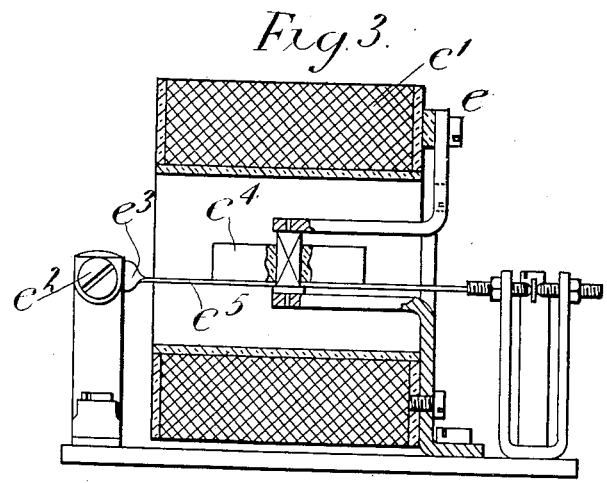
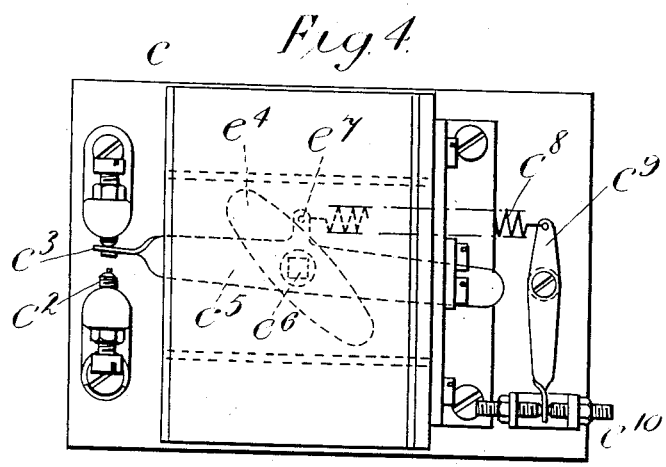
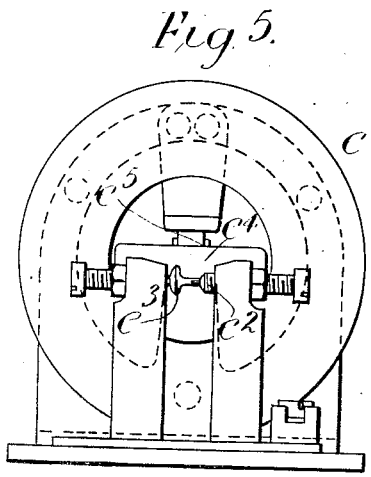

UNITED STATES PATENT OFFICE.

WILLIAM JOHN RICKETS, OF BROCKLEY, LONDON, ENGLAND, ASSIGNOR TO ALFRED GRAHAM AND COMPANY AND SAID WILLIAM JOHN RICKETS, BOTH OF BROCKLEY, LONDON, ENGLAND.

HIGH AND LOW PRESSURE CONTINUOUS-CURRENT SYSTEM.

1,176,316.  Specification of Letters Patent.  Patented Mar. 21, 1916.

Application filed April 6, 1914. Serial No. 829,998.

*To all whom it may concern:*

Be it known that I, WILLIAM JOHN RICKETS, a subject of the King of Great Britain and Ireland, residing at Brockley, in the county of London, England, have invented Improvements in High and Low Pressure Continuous - Current Systems, of which the following is a specification.

This invention relates to improved systems for supplying continuous current at a lower pressure from high pressure mains and it comprises means for maintaining a secondary battery in a constantly charged condition for the supply of the low pressure current and for supplementing such battery supply when necessary by a supply obtained from the high pressure mains through a breaking down resistance which also serves to regulate the current for charging the said battery.

The principal feature of the invention is a novel combination of relays and resistances by which the connection and disconnection of the battery for charging purposes is rendered positive and vibration or chattering movements of the relays avoided. For this purpose the battery charging circuit is closed through the agency of a relay which is controlled by another relay adapted to establish or remove a virtual short circuit across it, the first relay having associated with it an electrical element, such as a resistance, or a demagnetizing winding for the second relay, which produces a bias in favor of positive action of such second relay.

Figure 1:
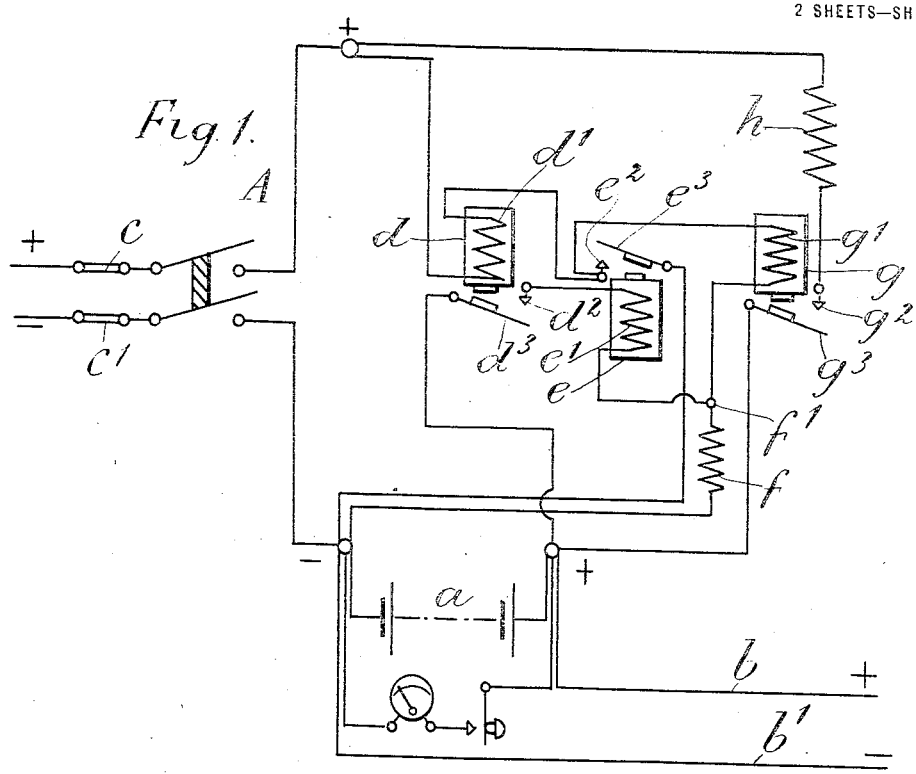
Figure 2:
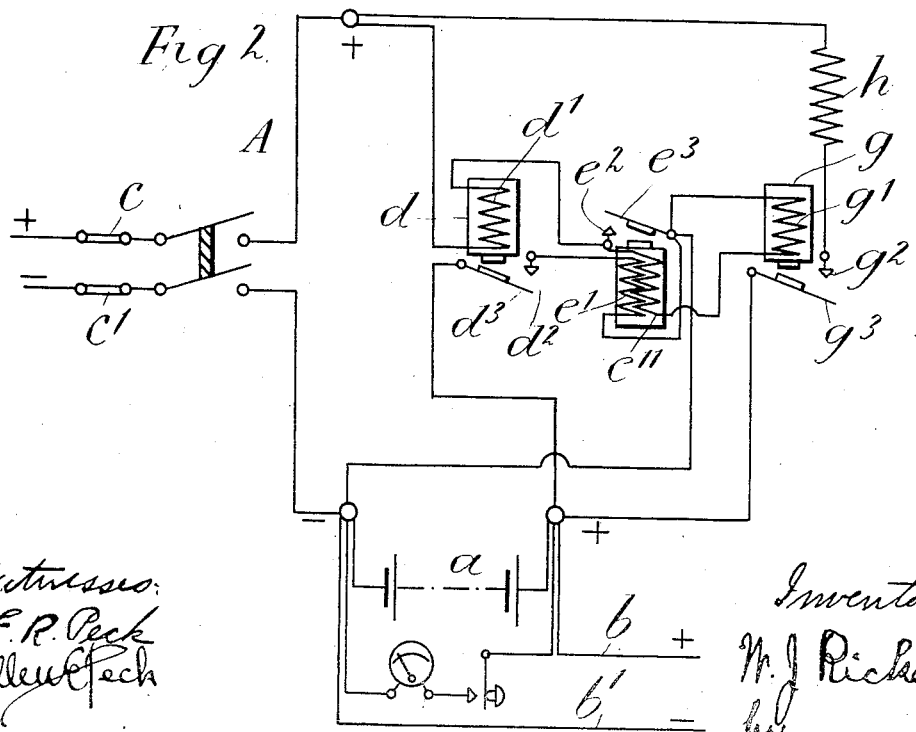

In order to illustrate the principle of the invention, two arrangements are shown diagrammatically in Figures 1 and 2 of the accompanying drawings. Fig. 3 is a sectional elevation, Fig. 4 a plan and Fig. 5 an end view of one form of the controlling relay which may be used.

Referring to Fig. 1, $a$ is a battery connected to the low pressure supply mains $b$ and $b^1$. $c$, $c^1$ are the high pressure mains bridged by the windings $d^1$, $g^1$ and resistance $f$ when the switch A is closed. Of these windings $d^1$ forms the exciting coil of a relay $d$ and $g^1$ the exciting coil of a relay $g$. A relay winding $e^1$ actuating a relay $e$, is adapted to be connected at one end to one pole, say the $+$ pole of the battery $a$ when the relay $d$ operates and its other end is or may be permanently attached to the junction terminal $f^1$ of the resistance $f$ and winding $g^1$. The relay $e$ is so constructed as to close its contacts $e^2$, $e^3$ when a certain voltage is applied to the extremities of its exciting winding $e^1$ and to separate the said contacts when this voltage is lowered only a very small amount.

The operation of the system is as follows:—When the mains $c$ and $c^1$ are at the required pressure and the switch A closed, current will pass in series through the windings $d^1$, $g^1$ of the relays $d$ and $g$ respectively and the contacts $d^2$, $d^3$ and $g^2$, $g^3$ will be closed and current will pass through a resistance $h$ to charge the battery $a$, or to supply the low pressure mains $b$, $b^1$. Simultaneously, the winding $e^1$ of the relay $e$ will be connected through the contacts $d^2$, $d^3$ to the positive pole of the battery $a$ and the pressure across its winding will be equal to the pressure of the battery $a$ minus the voltage drop in the resistance $f$, the drop in this resistance being due to the current flowing through the relays $d$ and $g$ and that passing through relay $e$. When the voltage of the battery $a$ is sufficiently increased, owing to its charging up, the armature or equivalent of the relay $e$ will move and close contacts $e^2$ and $e^3$. This practically short circuits the relay $g$ and consequently breaks the charging and feeding circuit through the resistance $h$. At the same time the relay $e$ receives a slightly increased voltage which causes its local contacts $e^2$, $e^3$ to be positively held closed, this being due to the voltage drop in the resistance $f$ which is diminished firstly by reason of the current formerly flowing through the relay winding $g^1$ being diverted direct to the negative pole of the battery and secondly by reason of the relay winding $g^1$ being connected in parallel to the resistance $f$. The voltage across the resistance $f$ is in all cases small and is quite insufficient to operate the relay $g$. When the battery $a$ is slightly discharged and the voltage across the relay $e$ is diminished, its contacts $e^2$ and $e^3$ will be opened and relay $g$ will again close the charging circuit through the resistance $h$ and contacts $g^2$, $g^3$. As the connections are now in the original condition, the voltage across the relay $e$ will be further slightly diminished and its contacts $e^2$, $e^3$ positively moved into the open position.

A form which the relay $e$ may conveniently take is shown in Figs. 3, 4, and 5 where an iron armature $e^4$ of the elliptical shape shown, is mounted at its center on a pivot $e^6$ within the relay winding $e^1$ and at an angle preferably of 45° to its axis, such armature bearing a current carrying member $e^5$ which is so shaped, as shown, that the whole moving system is balanced. The member $e^5$ is provided with an arm $e^7$ so that a spring $e^8$ can be employed to normally hold the relay contacts $e^2$ and $e^3$ open, the contact $e^3$ being moved to the closed position by the movement of the armature $e^4$ when the relay is energized. The tension of the spring $e^8$ may be varied by altering the position of the adjustable lever $e^9$ by means of adjusting screws $e^{10}$.

In the modification of the system shown in Fig. 2 the positive action of the relay $e$ is insured by the use upon it of a second winding $e^{11}$ shown as connected in series with the winding $g^1$ of relay $g$, although it may be otherwise arranged so as to be brought into circuit when the relay $e$ is caused to act. The winding $e^{11}$ is magnetically opposed to the main winding $e^1$ and acts to slightly diminish the magnetization of the relay when charging of the battery $a$ is taking place and to allow the magnetization to increase when charging ceases.

With both modifications the circuit of the controlling relay $e$ is broken if and when no high pressure supply is available so that no constant drain of current through this relay can then take place.

I am aware that supply systems have been employed in which relays have acted as resistances and in which relays have been operated by short circuiting one or more of their windings or by breaking existing short circuits.

What I claim is:—

1. The combination with high pressure continuous current supply mains, a battery adapted to be charged thereby, lower pressure supply mains connected across such battery and a charging resistance included in one of the high pressure supply mains, of a relay connected across the high pressure mains and adapted, when the circuit of the latter is closed and is at the required voltage, to complete the circuit of the battery charging resistance, a controlling relay adapted to be connected across the battery and to establish or remove a virtual short circuit across the first named relay depending upon the voltage of the battery and an electrical element in circuit with the said first named relay adapted to produce a bias in favor of positive action of the controlling relay after the latter has established the said short circuit.

2. The combination with high pressure continuous current supply mains, a battery adapted to be charged thereby, lower pressure supply mains connected across such battery and a charging resistance included in one of the high pressure supply mains, of a relay connected across the high pressure mains and adapted, when the circuit of the latter is closed and is at the required voltage, to complete the circuit of the battery charging resistance, a controlling relay adapted to be connected across the battery and to establish or remove a virtual short circuit across the first named relay depending upon the voltage of the battery and an electrical resistance common to the circuits of both relays, such resistance acting to reduce the voltage across the controlling relay when the relay closing the charging circuit is effective and to increase the voltage after the charging circuit relay is short circuited.

3. The combination with high pressure continuous current supply mains, a battery adapted to be charged thereby, lower pressure supply mains connected across such battery and a charging resistance included in one of the high pressure supply mains, of a charging relay, a biasing resistance connecting one end of such relay to one of the high pressure mains and another relay connecting the opposite end of the charging relay to the other high pressure main, the said charging relay serving to close the circuit of the charging resistance when the high pressure supply circuit is complete and at the required voltage and a controlling relay having one end connected to the junction terminal between the charging relay and biasing resistance, while the other is adapted to be connected through the agency of the relay in series with the charging relay to the battery so as to be responsive to the voltage of the latter, the said controlling relay acting to establish or remove a virtual short circuit across the charging relay depending upon the said battery voltage.

4. The combination with high pressure continuous current supply mains, a battery adapted to be charged thereby and low pressure supply mains connected across such battery of two relays having their windings connected in series across said supply mains and adapted to act when the voltage across said mains is of the required value, a biasing resistance included in the circuit of said relays, a controlling relay having one end of its winding connected to the said relay circuit between the relays and a charging resistance connected at one end to the positive supply main, one of the relays when excited acting to connect the second end of the winding of the controlling relay to the opposite supply main to that to which the winding of the secondly mentioned relay is connected, the second relay when actuated serving to connect the second end of the charging resistance to the positive pole of the battery and the controlling relay when actuated serving to connect the circuit between the two first mentioned relays to the same supply main as that to which the winding of the second relay is connected.

Signed at London this sixteenth day of March, 1914.

WILLIAM JOHN RICKETS.

Witnesses:
 EDMUND E. BARNARD,
 E. A. SAUFTLEBER.